United States Patent [19]

Nelson

[11] Patent Number: 4,938,868
[45] Date of Patent: Jul. 3, 1990

[54] METHOD OF DISTILLING UNDER PARTIAL VACUUM

[76] Inventor: Thomas R. Nelson, 6889 Stratford Rd., Woodbury, Minn. 55125

[21] Appl. No.: 189,376

[22] Filed: May 2, 1988

[51] Int. Cl.$^5$ .............................. B01D 3/10; C02F 1/04
[52] U.S. Cl. ........................................... 203/1; 203/4;
  203/11; 203/40; 203/91; 203/DIG. 14;
  203/DIG. 20; 203/DIG. 25; 202/175; 202/176;
  202/181; 202/182; 202/185.2; 202/197;
  202/205
[58] Field of Search ............... 202/185.2, 185.1, 197,
  202/205, 175, 182, 176, 181; 203/11, 91, 40,
  DIG. 20, DIG. 14, DIG. 17, 4, DIG. 25, 1, 42

[56] References Cited

U.S. PATENT DOCUMENTS

| | | | |
|---|---|---|---|
| 585,365 | 6/1897 | Skiffington | 202/185.2 |
| 869,680 | 10/1907 | Aitken et al. | 202/197 |
| 2,006,985 | 7/1935 | Claude et al. | 202/185.2 |
| 3,020,215 | 2/1962 | Weber | 202/197 |
| 3,032,482 | 5/1962 | Shoemaker | 203/100 |
| 3,060,106 | 10/1962 | Keunecke et al. | 202/197 |
| 3,108,049 | 10/1963 | Bowers et al. | 202/197 |
| 3,480,513 | 11/1969 | Martin | 202/185.2 |
| 3,630,854 | 12/1971 | Koivisto | 203/11 |
| 3,674,652 | 7/1972 | Brown | 203/11 |
| 3,791,934 | 2/1974 | Webb | 202/173 |
| 3,796,640 | 3/1974 | Boomer | 203/11 |
| 3,986,938 | 10/1976 | Smith, Jr. | 203/11 |
| 4,269,664 | 5/1981 | Younger | 202/185 |
| 4,302,297 | 11/1981 | Humiston | 202/197 |
| 4,302,682 | 11/1981 | LaCoste | 290/1 |
| 4,319,965 | 3/1982 | Parker | 202/205 |
| 4,444,623 | 4/1984 | Younger | 202/202 |
| 4,622,103 | 11/1986 | Shirley-Elgood et al. | 202/197 |

FOREIGN PATENT DOCUMENTS 53-16949 2/1978 Japan ........................... 202/185.2

Primary Examiner—Wilbur Bascomb
Attorney, Agent, or Firm—Robert C. Baker

[57] ABSTRACT

The vacuum column system distills liquid under partial vacuum conditions. The system rigorously splashes and boils liquid in a boiler chamber so as to form vapor and a rising mist from the splashing liquid. The vapor and mist rise in a circularly converging path through a mist collector. The heavier mist strikes the surfaces of the mist collector and deposits on those surfaces, thereby separating itself from the vapor. The vapor is then drawn to a condensor chamber where droplets of treated liquid are sprayed through it and fall into a shallow pool of treated liquid. The droplets seed condensation of the vapor directly onto the droplets. Also, the droplets assist in encapsulating bubbles of vapor in the pool as the droplets fall into the pool. The bubbles are then entrained with other treated liquid of the pool as the treated liquid is drawn from the pool down an entrainment conduit. A vortex action is created at the mouth or entrance port to the entrainment conduit from the pool, and enhances bubble entrainment. A jet stream of treated liquid into the vortex further enhances bubble entrainment into the entrainment conduit. The vapor of the bubbles condenses or dissolves into treated liquid to form more of it as the liquid travels down the entrainment conduit due to the increasing compression on the bubbles as lower levels are reached in the conduit.

30 Claims, 2 Drawing Sheets

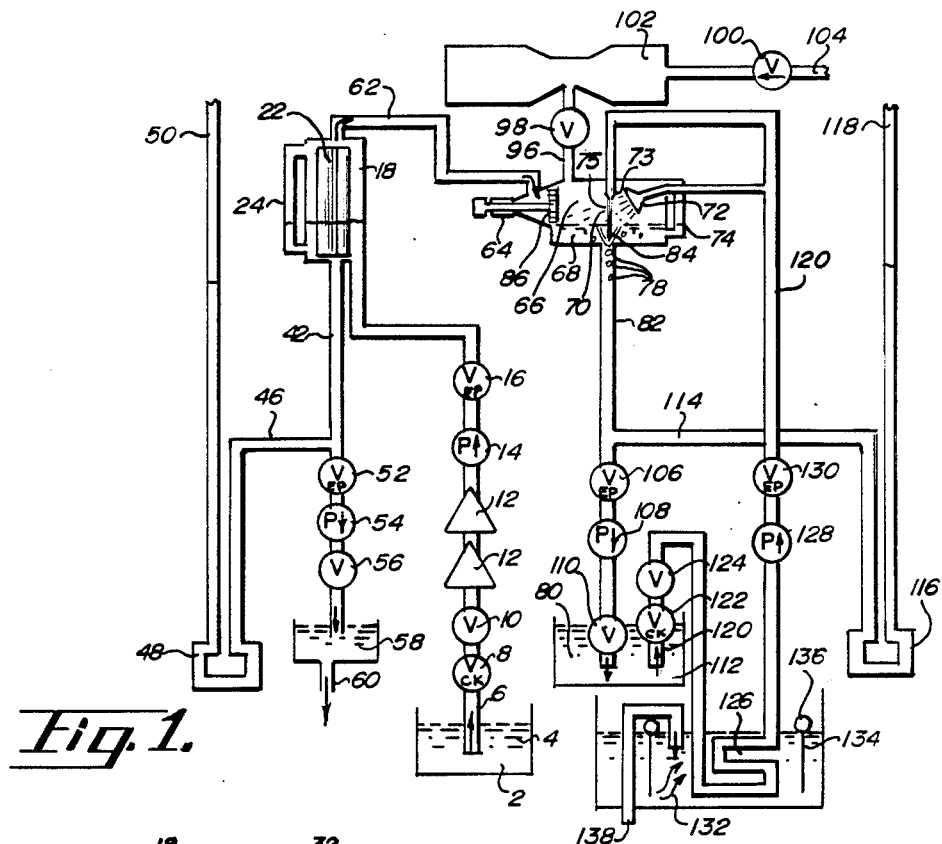
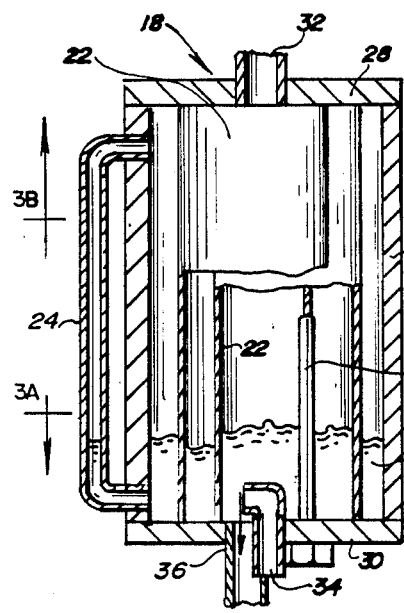
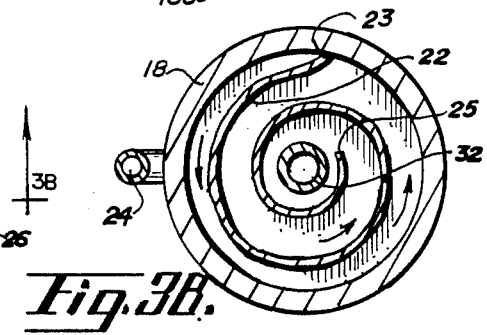
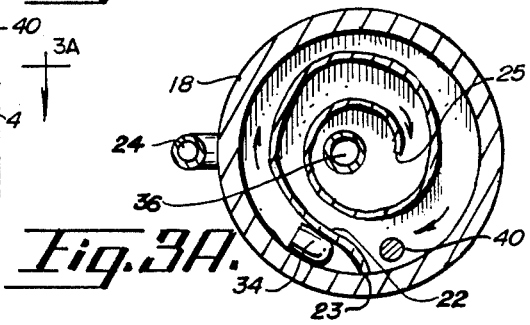
Fig. 1.
Fig. 2.
Fig. 3B.
Fig. 3A.

METHOD OF DISTILLING UNDER PARTIAL VACUUM

BACKGROUND OF THE INVENTION

This invention relates to a novel partial vacuum distillation system. The unique method and apparatus of the invention facilitates economic distillation of liquids such as, sea water, juices and other liquid mixtures. The distillation is enhanced by maintaining temperature differences between untreated liquid as compared to treated or condensed liquid.

Others heretofore have proposed systems and devices to distill liquids in partial vacuum chambers while maintaining temperature differentials. In so far as known, however, no one has figured out a way to provide not only partial vacuum chamber distillation using differentials in temperature to enhance distillation, but also a way to effect removal of mist which accompanies rapid processing action in the vaporization step. The invention provides a solution to this problem and additionally provides improved condensation and rapid vortex withdrawal of treated liquid and entrained bubbles from the condenser chamber. Additionally, the new vacuum column distiller may optionally be equipped with turbine features for driving the system's operation.

SUMMARY OF THE INVENTION

The new method and apparatus for distilling liquid under partial vacuum conditions treats untreated liquid to form treated liquid and residual concentrate. The distilling is enhanced by the difference in temperature between relatively warm untreated liquid as compared to relatively cool treated liquid. The greater the temperature differential between the liquids the more efficiently the system will operate.

Relatively warm untreated liquid is introduced into a boiler chamber while simultaneously withdrawing untreated liquid residual concentrate therefrom. The untreated liquid preferably travels a generally spirally converging path from introduction until it is withdrawn from the boiler chamber as liquid residual concentrate. The rate of the introduction of untreated liquid and withdrawal of the residual concentrate is balanced to maintain a relatively constant—although sloshing—liquid level in the boiler chamber.

A partial vacuum is maintained above the liquid in the boiler chamber. The conditions in the boiler chamber cause the untreated liquid to boil and form vapor as well as minute droplets of mist of untreated liquid. The amount of untreated liquid mist in the vapor increases as the boiling increases in vigor and as the rate of introduction of untreated liquid increases and causes increased splashing or sloshing or similar turbulance for the untreated liquid.

The rising mixture of vapor and mist from the surface of the untreated liquid in the boiler chamber is drawn upwardly and preferably in a generally spirally converging inward path through a mist collector. The mist collector has generally upright collecting surfaces which promote a striking or hitting deposit of the droplets of mist thereupon and the formation of a film-like coating of the mist which falls down the collecting surfaces. In this manner the mist is removed from the rising vapor. Most preferably, the falling flow down the collecting surfaces is returned to or falls into the untreated liquid of the boiler chamber.

From the boiler chamber, the vapor is drawn to a condenser chamber. The condenser chamber is maintained under conditions effective to continually draw vapor from the mist collector into the condenser chamber. In the condenser chamber, droplets of relatively cool purified or treated liquid are sprayed through the vapor and seed condensation of the vapor onto the droplets, so as to form more treated liquid. The sprayed droplets fall into a shallow pool at the base of the condenser chamber. The falling droplets cause splashing and turbulance in the shallow pool. In this manner, some of the vapor is encapsulated as bubbles in the liquid as it collects in a shallow pool at the base of the condenser chamber.

Collected treated liquid and entrained bubbles of vapor in the shallow pool are withdrawn down an entrainment column or conduit from the base of the condenser chamber at a rate sufficient to create a vortex at the mouth or entrance port to the entrainment column or conduit leading from the shallow pool. A jet nozzle shoots a vertical jet of treated liquid into the vortex formed at the mouth of the entrainment conduit to reduce bubble size and to force bubbles down the entrainment conduit. The entrained bubbles of vapor gradually condense or dissolve in the liquid of the entrainment column as the weight or pressure of liquid in the column increases during its downward travel.

The rate at which collected liquid and entrained bubbles are withdrawn is ideally sufficient to maintain a greater degree of partial vacuum in the condenser chamber than in the boiler chamber. This greater partial vacuum draws the rising vapor of liquid and mist from the boiler chamber through the mist collector for removal of mist and then draws the vapor from the mist collector into the condenser chamber.

The partial vacuum in the boiler chamber is not alone maintained by the greater degree of vacuum in the condenser chamber. It is also partially created or maintained by the gravitational weight of the column of relatively warm untreated liquid being introduced into the boiler chamber as well as by the gravitational weight of the column of residual untreated liquid concentrate being withdrawn from the boiler chamber. The partial vacuum in the condenser chamber likewise is at least partially maintained by the gravitational weight of the withdrawn treated liquid down the entrainment column.

Enhancement of the partial vacuum condition in the condenser chamber is accomplished by periodically purging some of the vapor therefrom as required. The purging assists in maintaining the condenser chamber under a greater degree of vacuum than the boiler chamber, to thereby constantly draw vapor from the boiler chamber through the treatment facilities into the condenser chamber for capture as treated liquid.

Optionally, a turbine may be placed between the boiler chamber and the condenser chamber to harness the energy of vapor flowing from the higher pressure and temperature region of the boiler chamber to the lower pressure and temperature region of the condenser chamber.

Many other features and advantages or benefits of the invention will be evident as this description proceeds.

BRIEF DESCRIPTION OF THE DRAWINGS

FIG. 1 is a diagrammatic view of overall apparatus of the invention;

FIG. 2 is a schematic vertical cross-sectional view, with parts broken away, illustrating the boiler chamber, including the mist collector;

FIG. 3A is a transverse cross-sectional view taken on line 3A—3A of FIG. 2, illustrating the spiral wall nature of the mist collecting surface which continues as a spiral wall to the base of the boiler chamber and in effect forms a spiral route in the boiler for the movement of introduced untreated liquid;

FIG. 3B is a transverse cross-sectional view taken on line 3B—3B of FIG. 2, illustrating the continued spiral wall nature of the mist collecting surface to the top of the housing forming the boiler chamber, and also illustrating the interior or centrally located port for withdrawing vapor from the boiler housing;

DESCRIPTION OF PREFERRED EMBODIMENT

Figure 4:
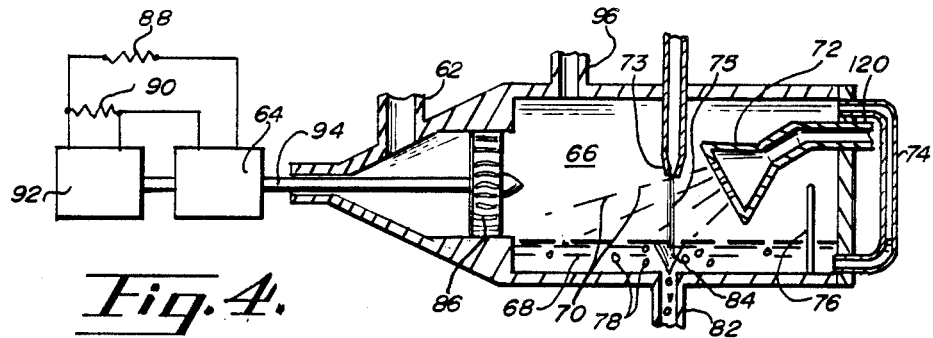
FIG. 4 is a schematic vertical cross-sectional view of the condenser chamber and includes an illustration of a turbine generator in association with the chamber.

Referring to FIG. 1, the overall apparatus comprises a boiler chamber 18 fed with untreated liquid through conduit 6 and drained of untreated liquid concentrate through conduit 42. Vapor from the boiler chamber passes through conduit 62 to a condenser chamber 66. Condensate from the condenser chamber is withdrawn through depending conduit 82. The condensate comprises the treated liquid; and treated liquid or equivalent is passed upwardly through conduit 120 and sprayed into the condenser chamber to facilitate vapor condensation. A partial vacuum is maintained in a condenser chamber and extends through the conduit 62 feeding the condenser chamber as well as into the boiler chamber 18. A venturi vacuum pump 102 facilitates maintaining the partial vacuum condition and is employed intermittently to remove excess vapor or dissolvable gasses from the condenser chamber so as to maintain the proper level of reduced pressure for dynamic operation of the system.

The details of the preferred embodiment will now be discussed with particular reference to the distillation of sea water (i.e., untreated liquid) to form potable treated water and remaining residual concentrate sea water.

The sea water supply conduit 6 (see FIG. 1) is provided for drawing untreated sea water 4 from a raw source such as an ocean 2 or a solar pond. Supply conduit 6 may pass through the heating means 12 to warm or heat the sea water. A pump 14 pushes the sea water up through electropneumatic valve 16 to the boiler chamber 18. The base or lowermost part of the boiler chamber should be located well above sea level. Generally the boiler chamber will be located at least thirty feet above the brine reservoir 58 and the ocean 2. The boiler chamber may be as high as forty or fifty feet or more above the brine reservoir and the ocean. A preferred height is approximately thirty-two feet. Pipes supplying to and withdrawing liquid from chambers of the apparatus may be about 1.2 to 2.5 centimeters (about ½ to 1 inch) in diameter, or possibly of a greater diameter such as 5 cm and in some applications even more. Any suitable support structure may be used for securing the apparatus chambers and other elements at appropriate elevation and relationship to each other.

Refer now to FIG. 2 for details of the boiler chamber 18. The housing of the boiler chamber is defined by a vertical cylindrical wall 26 having a top and a bottom edge and having a circular shaped top horizontal plate or wall 28 and bottom horizontal plate or wall 30 fixed to the top and bottom edges of cylindrical wall 26. The top wall 28 and bottom wall 30 are suitably bolted to the cylindrical wall 26 using appropriate gasket means to seal the connection. The top wall 28 has a centrally located vapor outlet port 32 for the removal of water vapor as well as any water dissolvable gasses in the vapor. Water dissolvable gasses are commonly oxygen, nitrogen as well as other air gasses present in dissolved condition in liquids such as sea water. They vaporize with water vapor in the boiler chamber. The circular bottom wall 30 of the boiler contains a sea water inlet port 34 spaced inwardly from but near the outer edge of the bottom wall 30, and an untreated liquid residual concentrate outlet port 36 centrally located for the removal of residual concentrate. Residual concentrate refers to untreated liquid which has been passed into the boiler chamber and in part vaporized therein so as to concentrate non-vaporized constituents.

Within the boiler housing is a mist collector 22 (see FIGS. 1, 2, 3A and 3B) which has generally vertical collecting surfaces for the collection of the mist formed from boiling untreated liquid. The mist of tiny droplets or particles of the untreated liquid contains small amounts of matter undesired in treated liquid (i.e., liquid formed by condensation of vapors of the untreated liquid). In the case of sea water which is salty, the mist contains salt and is referred to as a brine mist. The mist collector 22 is suitably fabricated from a rectangular sheet of metal having a top edge, a bottom edge and two side edges, with the height being approximately equal to the height of the cylindrical wall 26 of the boiler chamber. The sheet of metal is rolled at least one revolution in a spiral manner about a vertical or height axis. All portions of the spiral convolutions of the sheet are spaced from each other. The rolled metal sheet forms the mist collector 22 when attached or abutted at its top and bottom edge to the top and bottom walls of the boiler chamber. Preferably one side edge 23 is attached or fixed to the interior of cylindrical wall 26; and the other side edge 25 terminates radially inward but at a location spaced from the central axis of the chamber.

Referring partially to FIGS. 3A and 3B, sea water is introduced through inlet port 34 (generally peripherally located in bottom plate 30) and removed through outlet port 36 (generally centrally located in bottom plate 30). The introduction and removal is conducted at a relatively rapid rate and causes turbulence and the rise of a mist of untreated liquid. The rolled metal sheet of the mist collector depends from the top plate or wall 28 to the bottom plate or wall 30 forcing the introduced sea water to travel in a spirally converging path. The construction of the mist collector wall 22 forces the water vapor (and water dissolvable gasses) as well as mist of the untreated liquid to flow in an upward and ultimately in a spirally converging path as they are exited through the central vapor outlet port 32. The centrifugal effect of this spiral path assists in causing brine mist to strike the brine collecting surface 22 and become deposited on it. As the build up of deposit increases, sufficient continuity of the deposit creates a film which falls downwardly into the sea water at the base where a spirally converging movement is also taking place. Then the concentrate at the base is removed through the outlet port 36.

The brine residual concentrate conduit 42, (see FIG. 1,) conducts brine residual concentrate downwardly from the boiler chamber 18. The residual concentrate conduit 42 is buffered by the brine backfill conduit 46. The brine backfill conduit 46 contains a lower end trap portion 48 between it and the vent conduit or pipe 50 so as to prevent air from being sucked into the residual concentrate conduit and yet buffer any severe liquid movements. The vent conduit 50 is suitably open to the atmosphere and allows the residual concentrate in the brine backfill conduit 46 to move freely. Conduit 50 may optionally be transparently constructed to serve as a visual boiler level indicator.

The flow of residual concentrate downwardly through the residual concentrate conduit 42 is controlled by electropneumatic valve 52, pump 54 and manual valve 56. The residual concentrate is then stored in a residual concentrate reservoir 58. The residual concentrate of the reservoir 58 is suitably periodically drained through disposal or drain conduit 60.

The water level in the boiler chamber may be measured both electronically and manually. A transparent side pipe 24 is connected near the top and the bottom portions of the cylindrical wall 26 of the boiler chamber for visual observation of the water level in the boiler chamber. Optionally, the boiler chamber may be constructed out of transparent materials for visual observation of the liquid level. A boiler level probe 40 of the capacitance type is provided to transmit signals to electropneumatic valves 16 and 52 to control the flow to and from the boiler chamber at rates which maintain a relatively constant sea water level in the boiler chamber.

Referring again to FIG. 1, water vapor is drawn from the boiler chamber 18 through vapor transfer conduit 62, and optionally through turbine 86 (which operates turbine generator 64) into the condenser chamber 66. The condenser chamber (see FIGS. 1 and 4) is generally cylindrically shaped about a horizontal axis and suitably has a conical end in which the turbine blade 86 is housed. To be recognized is that the condenser chamber is likewise elevated at least 30 feet above the sea and freshwater reservoir 112, suitably at a level or elevation comparable to that for the boiler chamber. A shallow pool 68 of relatively cool potable water is located at the base of the condenser chamber; and a partial vacuum is maintained in the condenser above the shallow pool 68.

In the condenser chamber 66, droplets 70 of cool treated liquid (e.g., potable water) are sprayed, as from shower nozzle 72, to seed the condensation of vapor as treated liquid. Also, a jet nozzle 73 may be employed to shoot a vertical jet stream 75 of potable water (which may be struck with droplets 70) directly into the mouth of the vertical entrainment column 82 and then directly into the vortex 84 for the purpose of forcing bubbles of vapor down the entrainment column with withdrawn treated liquid. The jet stream 75 assists in seeding condensation of vapor in the condenser chamber, but most particularly does so by causing improved vapor bubble entrainment in pipe 82. The water level at the base of the condenser chamber may be visually monitored by observing the level in the transparent level-indicator pipe 74 and also may be electronically monitored by a level probe 76. Optionally, the condenser chamber may be constructed of transparent materials for visual water level observation. The condenser level probe 76 is of a capacitance type and controls electropneumatic valves 106 and 130 in pipes 82 and 120 so as to regulate the rate of withdrawal from pool 68 down pipe 82 and the rate of treated liquid movement up pipe 120 for spraying into the condenser 66. In this manner the level of the pool 68 is controlled. The shallow pool 68 generally will contain bubbles 78 of vapor encapsulated in the liquid of the pool, especially when the system is operated at a rapid rate as preferred. The bubbles 78 are entrained with treated liquid as it is drawn downwardly through exiting entrainment conduit 82, which has a diameter or cross section distance of at least 1.2 cm and preferably 2.5 cm or even 5 cm or more. This action creates a vortex 84 at the mouth or entrance port to conduit 82. The jet stream 75 should strike the vortex 84 at approximately the bottom center of the vortex. This stream tends to reduce vapor bubble size and force bubbles (which are much smaller in cross section than pipe 82) down the entrainment conduit 82 by the downward force of the jet. The rapid vertical downward movement enhances the size of the vortex and the entrapment of vapor bubbles in the liquid withdrawn from the pool through the conduit 82.

Water vapor and water dissolvable gasses flowing through the vapor transfer conduit 62 turn an optional turbine 86 which operates the electrical generator 64. The electricity may be used to operate pumps for the system or may be transferred to wherever electrical demand exists. The turbine satisfies electric load 88 and a shunt circuit 90 functions to cause spring loaded pressure to be applied by brake 92 to the shaft 94 in the event that the turbine 86 begins to rotate too rapidly.

In the event the vapor (and any water dissolvable gasses) in the condenser become excessive and cause a loss of the drawing power of the degree of partial vacuum condition to be maintained in that chamber, purging of excess vapor and gasses from the chamber by axillary means may be accomplished; and apparatus for this is illustrated in FIG. 1. The purging conduit 96 of the condenser 66 connects with a venturi vacuum pump 102. Air flows through venturi intake conduit 104 and through venturi control valve 100 to the venturi pump 102 creating a venturi effect pressure drop. To purge, the system valve 98 is opened to allow water dissolvable gasses and water vapor to be withdrawn from condenser 66 and valve 100 is opened to create the venturi pressure drop. Illustratively a venturi vacuum pump as illustrated can be effective to reduce pressure in the condenser to 60 millimeters of mercury in less than 30 seconds. In any event, the pressure reduction to maintain the condenser under the desired partial vacuum for continued effective operation of the system is quickly accomplished.

The entrainment conduit 82 depending from condenser 66 contains electropneumatic valve 106, a pump 108 and a manual valve 110 which are used to control the withdrawal of potable water from condenser 66 and passage of it to reservoir 112. The entrainment conduit 82 is buffered by potable water backfill (or expansion reservoir) conduit 114. The backfill conduit 114 contains a lower elevation end trap portion 116 which prevents air from being sucked into the system from vent conduit 118 as the treated liquid or potable water is sucked or pumped vigorously down conduit 82. The vent conduit 118 allows the level of potable water within potable water backfill conduit 114 to adjust freely, and thus buffers any violent change of flow down conduit 82. The potable water height in conduit 118 will be less than the height in the condenser chamber due to the partial vacuum condition maintained. Pipe 118 may optionally be transparently constructed to serve as a visual condenser chamber level indicator.

The potable water supply conduit 120 supplies relatively cool potable water for spraying through nozzle 72 into the vapor in the condenser chamber 66. A check valve 122 and a manual valve 124 control the flow of water through conduit 120 to be cooled in heat exchanger 126. From the heat exchanger 126, the potable water is pumped by pump 128 through electropneumatic valve 130 and then through shower nozzle 72 and jet nozzle 73. A separate conduit and pumping system may be employed for the jet nozzle where greater pressures of jet stream impact are desired. The heat exchanger 126 is located within a cool region such as in a cool freshwater lake or near a cool ocean current 132. The cool ocean current 132 is passed in a channel between retaining walls 134 which are suitably supported by buoys 136. Alternatively, cold liquid may be supplied through a conduit 138 to the heat exchanger 126.

Figure 5:
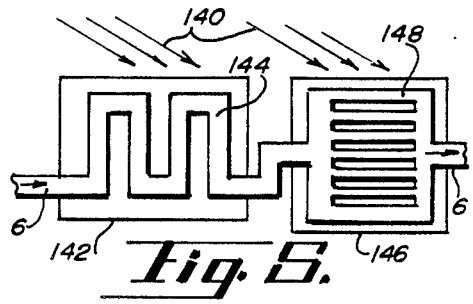
FIG. 5 is a schematic diagram showing a serpentine pipe through one solar collector and showing parallel divided pipes through another solar collector.

Refer to FIG. 5 for a discussion of heating means 12 in FIG. 1. Sea water incoming through pipe 6 is heated as the sun's rays 140 strike a dark heat absorbing surface of the heating means. The sea water first travels in conduit 6 through pavement solar collector 142 which is constructed of pavement and houses a serpentine portion 144 of pipe 6. The sea water then travels through a second solar collector 146 which is constructed with a glass glaze spaced with styrofoam above a divided portion 148 of pipe 6. The second solar collector 146 is suitably tilted toward the sun with a landfill for maximized collection of solar energy. The solar collectors add thermal energy to the sea water and elevate it in temperature (but well below a sea level boiling temperature) for more effective vaporization in the boiler chamber so as to enhance the performance of the system.

Figure 6:
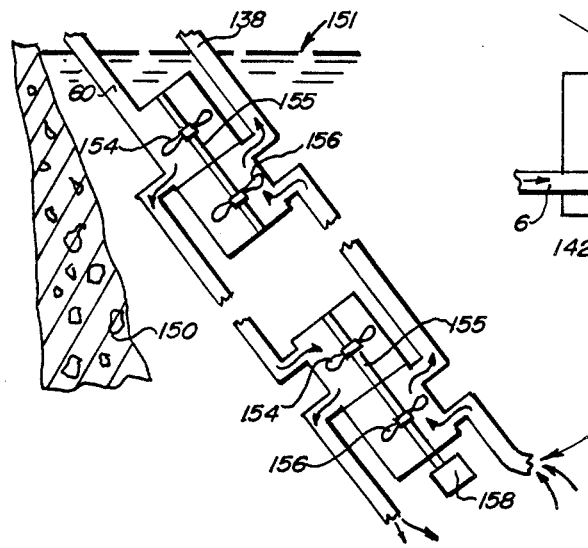
FIG. 6 is a schematic diagram of a turbine arrangement actuated by residual untreated liquid concentrate as it falls downwardly through conduit means, with the energy of fall employed to pump upwardly a supply of liquid.

Referring to FIG. 6, a system for utilizing the energy of residual concentrate from reservoir 58 (see FIG. 1) will be described. Residual concentrate descending from the residual concentrate reservoir 58 flows downwardly through disposal conduit 60 suitably near a continental shelf 150 to an ocean floor hundreds of feet below sea level 151. The brine residual concentrate generally will have a raised specific gravity such as about 1.1 which is greater than raw sea water. This creates a relative pressure head in the downward conduit 60. The downward flow of residual concentrate is conducted through turbine members 154 in conduit 60. The turbine members or blades 154 are on a common shaft 155 which rotates pump blades 156 in an adjacent cold sea water upward conduit 138 The sea water upward conduit 138 starts at the ocean floor or a low level where cool sea water is located. Cool sea water is pumped up conduit 138 by blades 156 to feed the heat exchanger 126 illustrated in FIG. 1.

The turbines 154 and 156 are set up such that the residual concentrate flows down the disposal conduit 60 turning the primary turbine blades 154 which turn the secondary turbine blades 156 so as to pump cold sea water from the ocean floor to the heat exchanger 126 for effective cooling of the potable water to be sprayed into condenser 66. The primary and secondary turbines are placed at periodic intervals and are constructed as readily detachable units so that they may be easily taken to the surface for repair. A turbine electrical generator 158 may be employed, if desired, to generate electricity.

Figures 7, 8:
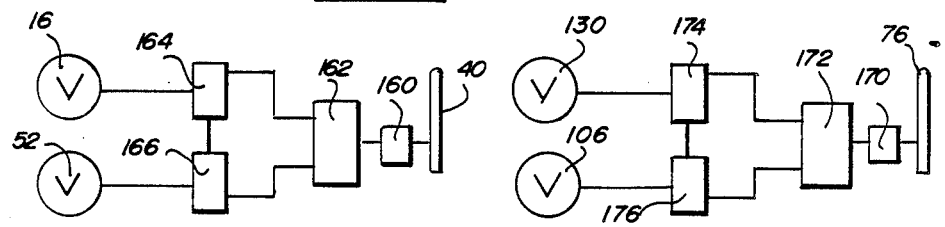
FIG. 7 is a schematic diagram of means for controlling the level of untreated liquid in the boiler chamber.
FIG. 8 is a schematic diagram of means for controlling the level of liquid in the condenser chamber.

Referring to FIG. 7, the boiler level sensing probe 40 is employed for controlling the electropneumatic valve 16 of the sea water supply conduit 6 and electropneumatic valve 52 of the residual concentrate conduit 42. The level probe 40 generates a signal which is amplified by amplifier 160 and then is processed through a boiler level translator transmitter 162. The transmitter 162 sends a signal in series to the boiler level overflow controller 164 and the boiler level underflow controller 166. The boiler level overflow controller 164 controls the setting of electropneumatic valve 16 of the sea water supply conduit 6. The boiler level underflow controller 166 controls the setting electropneumatic valve 52 of the residual concentrate withdrawal conduit 42. To lower the level in the boiler chamber valve 16 will be partially closed and valve 52 will be relatively opened. Other means may be employed to adjust the valves 16 and 52 in such a manner as to maintain a relatively constant level in the boiler chamber 18.

In FIG. 8, a control system for maintaining a relatively constant level of potable water or treated liquid in the condenser chamber 66 is illustrated. This system controls electropneumatic valve 106 in the entrainment or removal conduit 82 and the electropneumatic valve 130 in the treated liquid conduit 120 emptying at spray nozzle 72 and the jet nozzle 73 into the condenser 66. The condenser level probe 76 (not shown in FIG. 1) is in the condenser 66 and sends a signal which is amplified by amplifier 170 and passed to transmitter 172. The transmitter 172 sends translation signals to the condenser overflow controller 174 and condenser underflow controller 176. The condenser overflow controller 174 controls electropneumatic valve 130 to the potable water supply conduit 120. The condenser level underflow controller 176 controls the electropneumatic valve 106 of the entrainment or withdrawal conduit 82 so as to control the flow out or removal of liquid from the condenser chamber 66. The potable water or treated liquid level in the condenser chamber is thereby maintained at a relatively constant level by adjusting electropneumatic valves 106 and 130.

To prepare the system for operation electropneumatic valves 16, 52, 106 and 130 are opened and exhaust valve 98 to the venturi 102 is opened. The manual valves 10, 56 and 110 are closed and manual valve 124 is opened. Then pump 128 is turned on to fill the entire system with potable water. Internal air escapes through valve 98 as well as through pipes 46 and 114. The venturi vacuum pump 102 may also be turned on at this point to expedite the process. After the system is purged of air and filled with potable water, valve 98 to the venturi is closed. Then manual valves 10, 56 and 110 are opened. The gravitational weight of the liquid in conduits 6, 42, 82 and 120 creates a partial vacuum in the boiler and condenser chambers. Then electropneumatic valve control system is placed in operation and pumping is started.

Specifically, in dynamic operation sea water 4 is brought from a warm current in the ocean 2 or a solar pond through the untreated liquid supply conduit 6. The sea water then passes through the check valve 8 and the manual valve 10 to heating means 12 (solar collectors) for heating the sea water. The sea water then is pumped by pump 14 through electropneumatic valve 16 to the boiler chamber 18. The sea water in the boiler chamber boils rigorously and vaporizes and also releases water dissolvable gasses in it. The speed of operation causes splashing of the sea water which creates a rising brine mist from the sea water. The mist is mixed with the water vapor and gases such as oxygen and nitrogen.

Residual concentrate is drawn down or falls down residual concentrate conduit 42 through the control of electropneumatic valve 52 and manual valve 56. Pump 54 may be used to assist the withdrawal. The residual concentrate is suitably stored in reservoir 58 and withdrawn from the reservoir 58 through disposal or removal conduit 60. The sea water preferably is boiled (under the vacuum conditions) to the extent that the residual concentrate normally achieves a specific gravity of about 1.1. A brine backfill conduit 46 buffers the residual concentrate conduit from pipe hammering caused by sudden changes in pressure within the residual concentrate conduit 42. The brine backfill conduit 46 is vented to the atmosphere and has an end trap portion 48 which prevents air from being drawn into the system.

The sea water within the boiler chamber 18 from introduction to withdrawal follows a generally spirally converging path with the concentration of the residual concentrate increasing from introduction to withdrawal as water vapor is removed. Water vapor, brine mist and water dissolvable gasses rise from the boiling sea water in an upwardly and spirally converging path through mist collector 22. The centrifugal force of the spiral path causes the denser brine mist to strike and deposit itself on the collecting wall surfaces 22 of the mist collector, where a film of the mist forms and falls down the collector surfaces into the sea water at the base of the boiler chamber. The water vapor and water dissolvable gasses are continually drawn in a spirally converging path to the central exit port 32 from the boiler chamber 18 into the transport conduit 62 leading to the condenser chamber 66. The greater partial vacuum in the condenser chamber 66 assists this. The vapor and any gasses pass through the turbine 86 on their way into the condenser 66. Alternatively, in very large scale operations the condenser chamber may be constructed with a transport conduit 62 hundreds of miles in length to supply steam for condensation in a remote location.

In the condenser chamber 66, droplets 70 of relatively cool potable water are sprayed from nozzle 72 to seed the condensation of water vapor onto the droplets 70. The droplets 70 strike a shallow pool 68 of potable water and create a splashing turbulence causing water vapor and water dissolvable gasses to be encapsulated as bubbles 78 in the shallow pool 68. The bubbles 78 are struck with vertical jet 75 which divides up the bubbles to reduce their diameter Withdrawal of the potable water and entrained bubbles 78 from the pool is accomplished at a rate sufficient to create a vortex 84 extending from the shallow pool 68 and partially down the entrainment or withdrawal conduit 82. The vertical jet 75 may be shot slightly off center of the vortex to enhance the downward force of the vortex. In this sense, the vertical jet stream nevertheless is approximately aimed at the vortex and is aimed into the vertical conduit 82. A downward jet stream velocity greater than about one foot per second is required to entrain bubbles of about 3 or 4 millimeters (about ⅛ inch) in diameter, as is preferred. Jet action assists in pushing such bubbles of vapor into the entrainment conduit 82; and the spinning motion of the vortex tends to center the bubbles in the conduit where the downward velocity or pull is maximal.

The partial vacuum in the condenser chamber 66 is maintained at a lower pressure than the partial vacuum in the boiler chamber 18. The lower temperature of the potable water in the condenser chamber as compared to the sea water in the boiler assists the maintenance of a greater partial vacuum in the condenser 66. The greater partial vacuum is suitably also in part maintained by the siphon or suction pump 108 which pulls the condensate down conduit 82, as well as the jet nozzle which pushes potable water and bubbles down the entrainment conduit. Thus, the rate at which the potable water and entrained bubbles 78 are withdrawn through entrainment conduit 82 contributes to maintaining a greater degree of partial vacuum in the condenser chamber than in the boiler chamber. The pressure difference functions as a driving force for drawing the rising mixture of water vapor, brine mist and water dissolvable gasses from the boiler chamber through the mist collector 22 into the condenser chamber.

The entrained bubbles 78 in conduit 82 are gradually condensed (and the water dissolvable gasses are gradually dissolved) in the potable water of the entrainment conduit 82 as the weight of the potable water upon the bubbles in the entrainment conduit 82 increases with the downward travel of the water. The entrained bubbles 78 which do not condense or dissolve into the system are entrained into fresh water reservoir 112. The bubbles in the fresh water reservoir are then released to the atmosphere which partially degasses the potable water 80 for improved operation. The potable water passes through electropneumatic valve 106 which controls the rate of potable water flowing from the condenser chamber. The entrainment conduit 82 is buffered from pipe hammering by a backfill conduit 114. The potable water continues through manual valve 110 into a potable water reservoir 112 for storage and removal as desired.

Both the shower nozzle 72 and the jet nozzle 73 are fed potable water from a source such as reservoir 112, or from a cool freshwater lake or well water. (In power generation or in the event that residual concentrate is the desired end product, cold sea water may be sprayed into the condenser chamber.) As illustrated, potable water to nozzles 72 and 73 travels through a check valve 122 which keeps the pump 128 primed, through a manual valve 124, and then through a heat exchanger 126 for relatively cooling it. The cooled potable water is then pumped by pump 128 through electropneumatic valve 130 which controls the flow to the nozzles 72 and 73. To be recognized is that the volume of treated liquid exiting the entrainment conduit from the condenser chamber substantially increases as compared to the volume of treated liquid sprayed and jet streamed into the condenser chamber.

The venturi vacuum pump 102 is connected to the condenser chamber 66 via a purging conduit 96 and is controlled in operation by valves 98 and 100. Optionally, valves 98 and 100 are suitably controlled by electronic sensing of increased levels of pressure caused by excesses of vapor and any water dissolvable gasses in the condenser 66.

The system is adaptable to distill other liquids than sea water. Illustratively, it may be used to distill alcohol mixtures, concentrate fruit juices, or sugar mixtures, and treat other liquids. In distilling other liquids such as fruit juices and sugar mixtures, the residual concentrate will be the concentrate of the desired product, and water will be removed from the juice in the boiler chamber. Therefore, this system may be operated using a wide variety of distillable liquid mixtures to form useful treated or purified products, distillates, concentrates and tenates.

Also, the invention may be embodied in other specific forms than illustrated without departing from the spirit or essential characteristics thereof. The illustrated embodiment is therefore to be considered in all respects as illustrative and not restrictive, the scope of the invention being indicated by the appended claims rather than by the foregoing description; and all changes which come within the meaning and range of equivalency of the claims are intended to be embraced thereby.

That which is claimed is:

1. A method of distilling liquid under partial vacuum conditions to form treated liquid and a residual concentrate of the liquid comprising:
   (a) introducing relatively warm untreated liquid into a boiler chamber having a base portion, said introduction of said untreated liquid being into the base portion of said boiler chamber, and simultaneously withdrawing residual concentrate of said untreated liquid from the base portion of said boiler chamber,
   (b) maintaining a partial vacuum above the untreated liquid in said boiler chamber for boiling of said untreated liquid and causing upward movement of a mixture of vapor and mist from said untreated liquid,
   (c) drawing said mixture of vapor and mist in an upwardly and spirally converging path through a mist collector having a vertically-oriented spiralled wall to remove mist from said vapor by deposit of said mist on said spiralled wall, and
   (d) condensing said vapor into treated liquid in a condenser chamber having a base while maintaining said condenser chamber at a greater partial vacuum than said boiler chamber and maintaining a shallow pool of treated liquid at the base thereof.

2. The method of claim 1 wherein the untreated liquid is introduced into said boiler chamber under conditions which cause a spiralling motion and surface level splashing of it.

3. The method of claim 1 wherein said mist collected by said mist collector forms a film on the spiralled wall of said collector and said film slides downwardly on said spiralled wall toward the base portion of said boiler chamber.

4. The method of claim 1 wherein said mixture of vapor and mist is drawn in a generally axial direction along said spiralled wall of said mist collector by the greater partial vacuum maintained in said condenser chamber.

5. The method of claim 1 wherein said condensing step includes the step of spraying droplets of relatively cool treated liquid through said vapor in said condenser chamber in a manner such that said droplets fall through said vapor and splash into said shallow pool.

6. The method of claim 1 wherein said condensing step includes the step of encapsulating vapor as bubbles in the pool of treated liquid at the base of said condenser chamber.

7. The method of claim 6 wherein treated liquid of said pool and encapsulated bubbles therein are withdrawn downwardly through an entrainment conduit by pump action in a manner creating a vortex movement in said pool at the mouth of said entrainment conduit.

8. The method of claim 1 additionally including the step of shooting a jet stream of treated liquid into the mouth of an entrainment conduit through which bubbles of vapor and treated liquid are withdrawn from the condenser chamber.

9. The method of claim 1 additionally including the step of sensing the level of said untreated liquid in said boiler chamber and using the sensed level to vary the rate of introduction of untreated liquid into said chamber.

10. The method of claim 1 wherein said vapor is drawn from said mist collector to said condenser chamber through a turbine.

11. The method of claim 1 additionally including passing withdrawn concentrate of said untreated liquid through a turbine.

12. The method of claim 1 wherein the residual concentrate withdrawn from said boiler chamber is drawn through a primary turbine which turns a shaft for operating a pump for pumping liquid upwardly.

13. The method of claim 1 wherein said greater partial vacuum condition in said condenser chamber is enhanced by periodically purging vapor from said condenser chamber.

14. A method of distilling liquid under partial vacuum conditions to form treated liquid, comprising:
   (a) introducing untreated liquid into a boiler chamber having a base portion,
   (b) maintaining a partial vacuum above the untreated liquid in said boiler chamber for boiling of said untreated liquid and causing vapor of said untreated liquid to escape from said untreated liquid,
   (c) drawing said vapor into a condenser chamber having a base, said condenser chamber being maintained at a greater partial vacuum than said boiler chamber and having a shallow pool of treated liquid at the base thereof,
   (d) spraying droplets of relatively cool treated liquid through said vapor in the condenser chamber to seed condensation of said vapor onto said treated liquid droplets and to entrain vapor as bubbles within said shallow pool, said spraying being conducted in a manner such that said droplets fall through said vapor and splash into said hollow pool to cause a splashing turbulence, and
   (e) withdrawing said treated liquid and entrained bubbles from the pool thereof downwardly through an entrainment conduit having an entrance port, said withdrawal being with pump action to effect a rate of withdrawal sufficient to form a vortex movement in the shallow pool at the entrance port to said entrainment conduit.

15. The method of claim 14 wherein said entrained bubbles of vapor in said entrainment conduit gradually condense in said treated liquid as the pressure of the treated liquid upon said entrained bubbles increases with the downward travel of said untreated liquid in said entrainment conduit.

16. The method of claim 14 additionally including shooting a jet stream of treated liquid into the entrance port of said entrainment conduit.

17. The method of claim 14 wherein said vapor is drawn into said condenser chamber through a turbine.

18. The method of claim 14 wherein said introduction of untreated liquid into the boiler chamber is conducted in a manner causing spiralling of it and at a rate which causes surface level splashing of it in said boiler chamber.

19. The method of claim 14 wherein residual concentrate of untreated liquid is formed in said boiler chamber and withdrawn from the base portion of said boiler chamber down a disposal conduit through a turbine.

20. The method of claim 14 wherein residual concentrate of untreated liquid is formed in said boiler chamber and is withdrawn from the base portion of said boiler chamber down a disposal conduit through a turbine which turns a shaft for operating a pump for pumping liquid upwardly.

21. The method of claim 14 including periodic venturi vacuum pump purging of vapor from said condenser chamber.

22. A method of distilling liquid under partial vacuum conditions to form treated liquid and a residual concentrate of the liquid comprising:
   (a) introducing untreated liquid into a boiler chamber having a base portion, said introduction of said treated liquid being into the base portion of said boiler chamber, and simultaneously withdrawing residual concentrate of said untreated liquid from said boiler chamber,
   (b) maintaining a partial vacuum above the untreated liquid in said boiler chamber for boiling of said untreated liquid and causing upward movement of a mixture of vapor and mist from said untreated liquid,
   (c) drawing said mixture of vapor and mist in an upward and spirally converging path through a mist collector having a vertically-oriented spiralled wall to remove mist from said vapor by deposit of said mist on said spiralled wall,
   (d) drawing said vapor from said mist collector through conduit means into a condenser chamber having a base, said condenser being maintained at a greater partial vacuum than said boiler chamber and having a shallow pool of treated liquid at the base thereof,
   (e) spraying droplets of relatively cool treated liquid through said vapor in the condenser chamber to seed condensation of said vapor onto said treated liquid droplets and to entrain vapor as bubbles within said shallow pool, said spraying being conducted in a manner such that said droplets fall through the vapor and splash into said shallow pool to cause a splashing turbulence, and
   (f) withdrawing said treated liquid and entrained bubbles from the pool thereof downwardly through an entrainment conduit having an entrance port, said downward withdrawal being with pump action to effect a rate of withdrawal sufficient to form a vortex movement in the shallow pool at the entrance port to said entrainment conduit.

23. The method of claim 22 wherein said mist forms a film on spiralled wall of said collector and said film slides downwardly on said spiralled wall toward the base portion of said boiler chamber.

24. The method of claim 22 wherein said vapor of said mist collector is drawn through an entrance opening of said conduit means to said condenser chamber, said entrance opening being at the upper inner portion of the spiralled wall of said mist collector.

25. The method of claim 22 additionally including shooting a jet stream of treated liquid into the entrance port of said entrainment conduit.

26. A method of forming treated liquid from untreated liquid comprising:
   (a) drawing vaporized untreated liquid from a boiler chamber into a condenser chamber having a base while maintaining said condenser chamber at a greater partial vacuum than said boiler chamber, said condenser chamber having a shallow pool of treated liquid at the base thereof,
   (b) spraying droplets of relatively cool treated liquid through said vapor in the condenser chamber to seed condensation of said vapor onto said treated liquid droplets and to entrain vapor as bubbles within said shallow pool, said spraying being conducted in a manner such that said droplets fall through the vapor and splash into said shallow pool to cause a splashing turbulence, and
   (c) withdrawing said treated liquid and entrained bubbles from the pool thereof downwardly through an entrainment conduit having an entrance port, said withdrawal being with pump action to effect a rate of withdrawal sufficient to form a vortex movement in the shallow pool at the entrance port to said entrainment conduit, while simultaneously shooting a jet stream of treated liquid into the entrance port of said entrainment conduit to enhance speed of withdrawal and condensation of vapor bubbles in said entrainment conduit.

27. A method of liquid processing under partial vacuum conditions, comprising:
   (a) introducing relatively warm untreated liquid into a boiler chamber having a base portion, said introduction of said untreated liquid being into the base portion of said boiler chamber in a manner causing a spirally converging path for said introduced untreated liquid in the base portion of said boiler chamber, and simultaneously withdrawing residual concentrate of said untreated liquid from a central location of the base portion of said boiler chamber,
   (b) maintaining a partial vacuum above the untreated liquid in said boiler chamber for boiling of said untreated liquid and causing upward movement of a mixture of vapor and mist from said untreated liquid, and
   (c) drawing said mixture of vapor and mist in an upwardly and spirally converging path through a mist collector having a vertically-oriented spiralled wall to remove mist from said vapor by deposit of said mist on said spiralled wall.

28. The method of claim 27 wherein the spirally converging path of said introduced untreated liquid is formed by a continuation of the spiralled wall of said mist collector into the base portion of said boiler chamber, and wherein mist deposited on the spiralled wall of said mist collector forms a film which falls downwardly into the base portion of said boiler chamber.

29. The method of claim 27 additionally including drawing the vapor from said mist collector and passing it into a condenser chamber.

30. The method of claim 29 additionally including condensation of said vapor in the condenser chamber into treated liquid be seeding action effected by spraying droplets of treated liquid through said vapor.

* * * * *